US012521626B2

(12) United States Patent
Xie et al.

(10) Patent No.: US 12,521,626 B2
(45) Date of Patent: Jan. 13, 2026

(54) IN-GAME DISPLAY CONTROLLING METHOD, DEVICE AND ELECTRONIC EQUIPMENT

(71) Applicant: NETEASE (HANGZHOU) NETWORK CO., LTD., Zhejiang (CN)

(72) Inventors: Jieqi Xie, Zhejiang (CN); Jie Chen, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 334 days.

(21) Appl. No.: 18/032,670

(22) PCT Filed: Mar. 24, 2022

(86) PCT No.: PCT/CN2022/082771
§ 371 (c)(1),
(2) Date: Apr. 19, 2023

(87) PCT Pub. No.: WO2022/252775
PCT Pub. Date: Dec. 8, 2022

(65) Prior Publication Data

US 2023/0405460 A1 Dec. 21, 2023

(30) Foreign Application Priority Data

Jun. 4, 2021 (CN) ......................... 202110629199.4

(51) Int. Cl.
*A63F 13/52* (2014.01)
*A63F 13/53* (2014.01)
*G06T 19/20* (2011.01)

(52) U.S. Cl.
CPC .............. *A63F 13/52* (2014.09); *A63F 13/53* (2014.09); *G06T 19/20* (2013.01); *G06T 2219/2004* (2013.01)

(58) Field of Classification Search
CPC ........... A63F 13/42; A63F 13/43; A63F 13/55
See application file for complete search history.

(56) References Cited

U.S. PATENT DOCUMENTS 9,511,281 B1 * 12/2016 McLellan ............... A63F 13/61
2004/0266505 A1 * 12/2004 Keam .................. A63F 13/533
463/1

(Continued)

FOREIGN PATENT DOCUMENTS

CN 108459811 A 8/2018
CN 110201403 A 9/2019

(Continued)

OTHER PUBLICATIONS

Minecraft video game developed and published by Mojang Studios and first released in Nov. 2011 and evidenced by Minecraft Wikipedia article (available online: https://en.wikipedia.org/wiki/Minecraft) (Year: 2011).*

(Continued)

*Primary Examiner* — James S. McClellan
(74) *Attorney, Agent, or Firm* — BCF LLP

(57) ABSTRACT

An in-game display controlling method, device and electronic equipment are provided. The method includes: determining, in response to the virtual article moving to a target area, a second display area of the first storage container, wherein the target area includes: a first display area of the first storage container, or an area which is away from the first display area at a distance within a preset range, the second display area is different from the first display area in terms of position and/or area range, and at least partial area of the second display area, with respect to the first display area, is (Continued)

closer to the virtual article; and controlling the first storage container to move from the first display area to the second display area.

20 Claims, 4 Drawing Sheets

(56) References Cited

U.S. PATENT DOCUMENTS

| | | | |
|---|---|---|---|
| 2008/0070686 A1 | 3/2008 | Satsukawa et al. |
| 2016/0198239 A1 | 7/2016 | Shenkler et al. |

FOREIGN PATENT DOCUMENTS

| | | | |
|---|---|---|---|
| CN | 111701233 A | 9/2020 |
| CN | 111701237 A | 9/2020 |
| CN | 111744176 A | 10/2020 |
| CN | 111782127 A | 10/2020 |
| CN | 111803933 A | 10/2020 |
| CN | 111821692 A | 10/2020 |
| CN | 111949900 A | 11/2020 |
| CN | 112206523 A | 1/2021 |
| CN | 112370780 A | 2/2021 |
| CN | 112764618 A | 5/2021 |
| CN | 113262474 A | 8/2021 |
| JP | 2013246708 A | 12/2013 |
| WO | 2020244415 A1 | 12/2020 |

OTHER PUBLICATIONS

Minecraft Beginners guide published by Cherry Lake Publishing and released in Jan. 2016. (Year: 2016).*

International Search Report (and English Translation) and Written Opinion with regard to PCT/CN2022/082771 mailed Jun. 22, 2022.

English Abstract for CN113262474 retreived on Espacenet on Apr. 12, 2023.

English Abstract for CN112206523 retreived on Espacenet on Apr. 12, 2023.

English Abstract for CN110201403 retreived on Espacenet on Apr. 12, 2023.

English Abstract for CN111821692 retreived on Espacenet on Apr. 12, 2023.

English Abstract for CN111701237 retreived on Espacenet on Apr. 12, 2023.

English Abstract for CN111803933 retreived on Espacenet on Apr. 12, 2023.

English Abstract for JP2013246708 retreived on Espacenet on Apr. 12, 2023.

Office Action with regard to the CN Patent Application No. CN202110629199.4 issued Sep. 22, 2023.

Office Action with regard to the JP Patent Application No. 2022-580271 issued Oct. 6, 2023.

* cited by examiner

IN-GAME DISPLAY CONTROLLING METHOD, DEVICE AND ELECTRONIC EQUIPMENT

CROSS REFERENCE OF RELATED APPLICATIONS

This application is the U.S. National Phase Application of PCT International Application No. PCT/CN2022/082771, filed on Mar. 24, 2022, which is based upon and claims priority to Chinese patent application filed on Jun. 4, 2021, the entire contents of both of which are incorporated herein by reference for all purposes.

TECHNICAL FIELD

The present disclosure relates to the technical field of games, and in particular, to an in-game display controlling method, device and electronic equipment.

BACKGROUND

In many game scenarios, usually the containers for placing articles belonging to the user, such as backpacks, safes, equipment areas, warehouses, and the like, are provided. According to requirements of the game, the user needs to transfer virtual article(s) between plural containers, for example, transfer the virtual article(s) from the warehouse to the backpack, from the backpack to the equipment area, and so on. When a user controls one virtual article to be transferred from one container to another container, the container display area corresponding to the target container needs to give a feedback prompt to remind the user that the virtual article can be put into the target container.

SUMMARY

The present disclosure provides a method, an electronic terminal, and a non-transitory machine-readable storage medium.

In the first aspect, the present disclosure provides an in-game display controlling method, including: controlling, by a terminal, a virtual article to move in response to a movement control operation for the virtual article, wherein the terminal includes a graphical user interface, the graphical user interface includes a first display area, and at least one virtual article and a first storage container are displayed in the first display area; determining, in response to the virtual article moving to a target area, a second display area for the first storage container, wherein the target area includes: a first display area of the first storage container, or an area which is away from the first display area at a distance within a preset range, the second display area is different from the first display area in terms of position or area range, and at least partial area of the second display area, with respect to the first display area, is closer to the virtual article; and controlling, by the terminal, the first storage container to move from the first display area to the second display area.

In the second aspect, an embodiment of the present disclosure provides an electronic terminal, including a display screen, a processor and a memory, wherein the memory stores machine-executable instructions that can be executed by the processor, the display screen is configured to display a graphical user interface, and the processor is configured to: control a virtual article to move in response to a movement control operation for the virtual article, wherein the graphical user interface includes a first display area, and at least one virtual article and a first storage container are displayed in the first display area; determine, in response to the virtual article moving to a target area, a second display area for the first storage container, wherein the target area includes: a first display area of the first storage container, or an area which is away from the first display area at a distance within a preset range, the second display area is different from the first display area in terms of position or area range, and at least partial area of the second display area, with respect to the first display area, is closer to the virtual article; and control the first storage container to move from the first display area to the second display area.

In the third aspect, an embodiment of the present disclosure provides a non-transitory machine-readable storage medium, wherein the machine-readable storage medium stores machine-executable instructions which cause, when called and executed by a processor, the processor to implement an in-game display controlling method, the in-game display controlling method including: controlling, by a terminal, a virtual article to move in response to a movement control operation for the virtual article, wherein the terminal includes a graphical user interface, the graphical user interface includes a first display area, and at least one virtual article and a first storage container are displayed in the first display area; determining, in response to the virtual article moving to a target area, a second display area for the first storage container, wherein the target area includes: a first display area of the first storage container, or an area which is away from the first display area at a distance within a preset range, the second display area is different from the first display area in terms of position or area range, and at least partial area of the second display area, with respect to the first display area, is closer to the virtual article; and controlling, by the terminal, the first storage container to move from the first display area to the second display area.

BRIEF DESCRIPTION OF DRAWINGS

In order to illustrate the specific embodiments of the present disclosure more clearly, the drawings that need to be used in the description of the specific embodiments or the prior art will be briefly introduced below. Obviously, the drawings in the following description are some of embodiments of the present disclosure. For those skilled in the art, other drawings can also be obtained from these drawings without creative efforts.

DETAILED DESCRIPTION

In order to make the objectives, technical solutions and advantages of the embodiments of the present disclosure clearer, the technical solutions of the present disclosure will be clearly and completely described below with reference to the drawings. Obviously, the described embodiments are part, but not all, of the embodiments of the present disclosure. Based on the embodiments of the present disclosure, all other embodiments obtained by those skilled in the art without creative efforts shall fall within the protection scope of the present disclosure.

In the related art, when the virtual article enters or partially enters the container display area of the target container, the color display parameters of the container display area are usually changed for the feedback prompt. For example, parameters, such as the color and brightness, etc. of the area or the area edge, are changed. For a light-colored interface, if these feedback prompts are achieved by using light or bright colors, the feedback prompts are not visually obvious, which is difficult to attract attention of the user. If these feedback prompts are achieved by using dark colors, it is easy for the user to misunderstand that the container is disabled. Therefore, the above-mentioned feedback prompting method is less intuitive and is easily limited by the color of the interface, thereby increasing the cost of the user for understanding the game.

Figure 1:
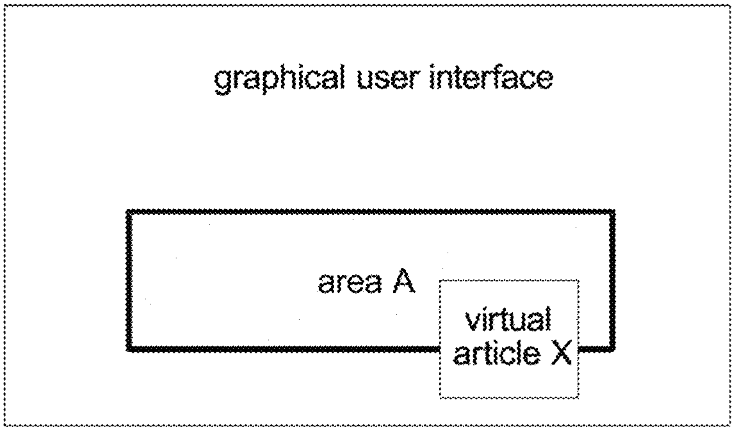
FIG. 1 is an interactive schematic diagram of controlling display in a game provided by an embodiment of the present disclosure.

In related game scenes, the containers, such as backpacks, safes, equipment areas, and warehouses, etc., are usually set up to hold virtual articles owned by the user. The user can control the virtual articles to move between backpacks, safes, equipment areas, and warehouses. When the user controls one virtual article to move from one container to another container, it is needed to give a feedback prompt at the container display area corresponding to the target container, so as to remind the user that the target container can hold the virtual article. In the related art, when the user controls the virtual article to enter or partially enter the container display area of the target container, the feedback prompts, such as, lighting the edge, drawing the edges with the special color, or highlighting an area, are usually displayed in the container display area. For example, referring to the interactive schematic diagram of controlling display in a game shown in FIG. 1, the area A is the container display area of the safe, wherein when the user drags the virtual article X to the area A, a feedback prompt, that the area is highlighted, the edge is drawn with special color, will be displayed at the area A.

For a light-colored interface, if the mode of a light-colored or bright-colored feedback prompt is used, the user may not be able to see clearly the feedback prompt due to the interface color being light. If the mode of a dark feedback prompt is used, it is easy to mislead the user into thinking that the container is a disable container. The above-mentioned feedback prompting modes are less intuitive, and easily limited by the color of the interface, thereby increasing the cost of the user for understanding the game.

The present embodiment provides a method, a device and electronic equipment of controlling display in a game, which technology can be applied to virtual scenes or game scenes in which virtual articles need to be held, transferred between positions, and managed.

The method of controlling display in a game in one of the embodiments of the present disclosure may run on a terminal device or a server. Here, the terminal device may be a local terminal device. When the method of controlling display in the game runs on the server, the method can be implemented and executed based on a cloud interaction system, wherein the cloud interaction system includes a server and a client device.

In one embodiment, various cloud applications, such as cloud games, can be run under the cloud interaction system. With the cloud game as an example, the cloud game refers to a game method based on cloud computation. In the running mode of the cloud game, the running main body of the game program and the main body of presenting the game screen are separated. The storage and running of the method of controlling display in the game are completed on the cloud game server. The functions of the client device include receipt and sending of the data and presentation of game screens. For example, the client device can be a display device with a data transmission function, close to the user side, such as, a mobile terminal, a TV, a computer, a handheld computer, etc. However, the terminal device of performing the information processing is a cloud game server in the cloud. When playing the game, the player operates the client device to send operation instructions to the cloud game server, and the cloud game server runs the game according to the operation instructions, encodes and compresses the data, such as, the game screen and etc., and returns it to the client device through the network, and finally, the game screen is decoded and output through the client device.

In some embodiments, the terminal device may be a local terminal device. With a game as an example, a local terminal device stores a game program and is used to present a game screen. The local terminal device is used to interact with the player through a graphical user interface, that is, conventionally, the game program is downloaded, installed and run through electronic equipment. The local terminal device may provide the graphical user interface to the player in various ways. For example, it may be rendered and displayed on the display screen of the terminal, or provided to the player through holographic projection. For example, the local terminal device may include a display screen and a processor, with the display screen configured for presenting a graphical user interface, the graphical user interface including game screens. The processor is configured for running the game, generating the graphical user interface, and controlling displaying of the graphical user interface on the display screen.

An embodiment of the present disclosure provides a method of controlling display in a game. A graphical user interface is provided through a terminal device, wherein the terminal device may be the aforementioned local terminal device, or may be the client device in the cloud interaction system aforementioned. The above-mentioned graphical user interface can be understood as an operation user interface displayed in a graphical manner, which is used to realize the interaction between the terminal device and the user who operates the terminal device. The graphical user interface includes virtual articles and a first storage container displayed in the first display area.

The above-mentioned virtual articles can be virtual weapons, virtual healing potions, or virtual equipment, etc. in the game scene. The above-mentioned first storage container can be a virtual warehouse, a virtual backpack, a virtual safe and other containers set in the game scene. The first storage container is the container which the user wants to move the virtual article into. When the user performs an opening operation for the first storage container, the first storage container is displayed in the first display area in the above-mentioned graphical user interface. If the capacity of the first storage container is relatively large, the first storage container can store the virtual articles of relatively large number, and placement positions of the virtual articles can be article grids or in other forms. Plural placement positions can be arranged in sequence or in the form of a list. If the first storage container has a relatively large capacity and the first display area is limited, then at the same time, only part of the placement positions of the first storage container can be displayed in the first display area. If the capacity of the first storage container is relatively small, all placement positions of the first storage container can also be displayed in the first display area.

Figure 2:
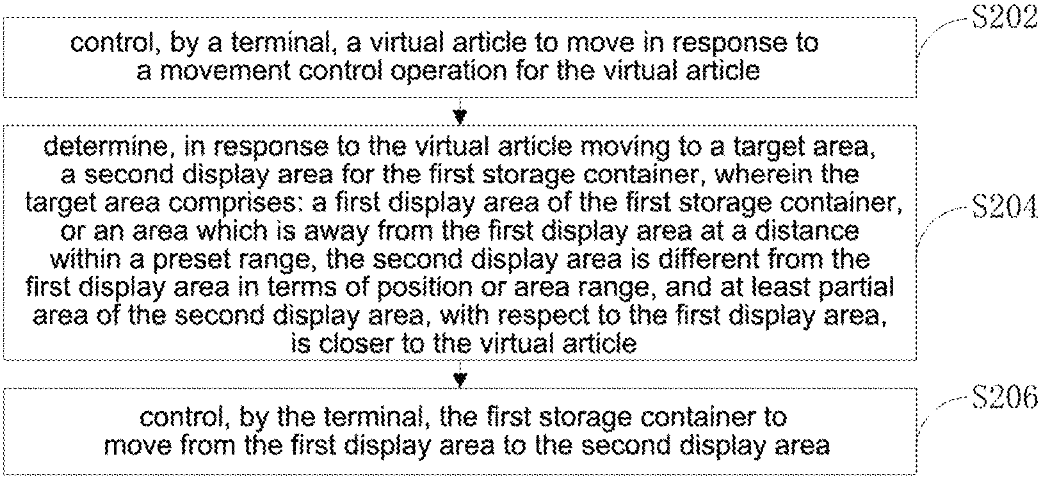
FIG. 2 is a flowchart of a method of controlling display in a game provided by an embodiment of the present disclosure.

Referring to FIG. 2, the method of controlling display in the game includes the following steps:

Step S202, controlling the virtual article to move, in response to the movement control operation for the virtual article.

The above-mentioned graphical user interface may include one first display area. For example, only the first display area for displaying warehouses is included. The graphical user interface may also include plural first display areas. For example, it simultaneously includes a first display area for displaying backpacks, a first display area for displaying safes and the first display area for displaying the warehouses, etc. The above-mentioned movement control operation for the virtual articles may specifically be a drag operation or a touch sliding operation acting on the virtual article. Usually, it is needed to click the virtual article first, and then move the finger or mouse in the clicked state. At this time, the position of the virtual article is changed along with the movement of the finger or mouse. For example, in the initial state, the above virtual article is located at Position 1 in the first display area of the backpack. The user can select the virtual article from Position 1 and drag it out from Position 1 in the selected state. At this time, the virtual article moves along with the drag operation of the user, thereby controlling the virtual article to move in the graphical user interface.

Step S204, determining the second display area of the first storage container in response to the virtual article moving to the target area, wherein the target area includes: the first display area of the first storage container, or the area which is away from the first display area at a distance within a preset range; the second display area is different from the first display area in terms of the position and/or area range; and at least partial area of the second display area is closer to the virtual article, with respect to the first display area.

The above-mentioned target area may be the first display area of the first storage container, or may be an area which is away from the first display area at the distance within a preset range. For example, when the user wants to drag the virtual articles stored in the virtual backpack to the virtual safe, the user can directly drag the virtual article to the first display area of the virtual safe, or drag the virtual article to the vicinity of the first display area, for example, the position near the edge of the first display area, etc. In actual implementation, when the user controls the virtual article to move to the target area, the first storage container usually gives a feedback prompt, for example, the position of the first display area can be changed, or the area range of the first display area can be changed, or the position and the area range of the first display area are changed at the same time, so as to determine the second display area of the first storage container, which can be set according to actual needs and is not limited here. A part or all area of the determined second display area is usually closer to the virtual article, with respect to the first display area. It can be understood that the distance between the part or all of the second display area and the virtual article is smaller than the distance between the first display area and the virtual article. For example, if the feedback prompt is given by changing the position of the first display area, then when the user controls the virtual article to move to the position close to the right edge of the first target area, the first display area is usually moved to the right, so that the determined second target area is closer to the virtual article.

Step S206, controlling the first storage container to move from the first display area to the second display area.

In some examples, after the above-mentioned second display area is determined, the first storage container in the graphical user interface can be controlled to move from the first display area to the second display area. For example, the first storage container can be controlled, according to a preset movement speed, to be moved from the first display area to the second display area, and so on.

In the above method of controlling display in the game, in response to the virtual article moving to the target area, the second display area of the first storage container is determined, wherein the target area includes: the first display area of the first storage container, or an area which is away from the first display area at the distance within a preset range. The second display area is different from the first display area in terms of the position and/or the area range. At least partial area of the second display area is closer to the virtual article, with respect to the first display area. The first storage container is controlled to move from the first display area to the second display area. In this method, after the virtual article is moved to the target area, by means of changing the position and/or area range of the display area of the first storage container, a feedback prompt for the movement of the virtual article is realized, and such feedback prompting method is more intuitive and easy for users to understand, and at the same time, it is not limited by the color and style of the interface, therefore reducing the cost of the user for understanding the game.

A specific application scenario applicable to this embodiment is described below. The above-mentioned graphical user interface further includes a container display area of the second storage container. The virtual article is pre-placed in the second storage container; and the virtual article is controlled to be removed from the second storage container, in response to a movement control operation for the virtual article.

The above-mentioned second storage container may be containers set in the game scene, such as, a virtual warehouse, a virtual backpack, a virtual safe and so on. The above-mentioned virtual articles are usually placed in the second storage container in advance. When the user performs an opening operation for the second storage container, the container display area of the second storage container is displayed in the above-mentioned graphical user interface. If the second storage container has a relatively large capacity and the container display area is limited, only part of the placement positions of the second storage container can be displayed in the container display area at the same time. If the capacity of the second storage container is relatively small, it is also possible that all the placement positions of the second storage container can be displayed in the container display area. In some examples, the user can make the virtual article move out of the second storage container by means of dragging or touch-sliding. For example, in the initial state, the virtual article is placed at Position 1 in the container display area of the backpack in advance, and the user can select the virtual article from the Position 1 and drag it out from the Position 1 in the selected state. At this time, the virtual article moves along with the drag operation of the user, and the virtual article is continuously dragged, and can be removed from the backpack.

In the above scene, the user can move the virtual article out of the container in which the virtual article is pre-placed, by performing the movement control operation on the virtual article, according to actual game requirements. The operation is simple and convenient, and the game experience of the user can be improved.

The specific manner of determining the second display area of the first storage container is described below. In response to the virtual article moving to the target area, the moving direction is determined based on the relative position between the virtual article and the first display area; and the first display area is controlled to shift along the moving direction to obtain the second display area.

In some examples, after the virtual article is moved to the target area, since the relative position between the virtual article moved to the target area and the first display area is not fixed, for example, the virtual article may be located in the position of the upper right corner or the upper left corner, etc. of the first display area, the moving direction of the first display area can be determined according to the relative position. The second display area can be obtained by controlling the first display area to shift to the moving direction. For example, if the virtual article is located in the position of the upper right corner of the first display area, the determined moving direction may be the direction of the upper right corner of the first display area, and the first display area is controlled to shift to the upper right corner (i.e., in the direction of the upper right corner), to obtain the second display area.

In order to further understand this embodiment, the above-mentioned specific determination method of the moving direction is described. In response to the virtual article moving to the target area, the first direction in which the virtual article is located relative to the first display area is determined as the moving direction. Alternatively, in response to the virtual article moving to the target area, the second direction whose direction difference value from the first direction is less than a preset difference value is determined as the moving direction, wherein the first direction includes: the direction in which the virtual article is located relative to the first display area.

The above-mentioned first direction can be determined based on any vertex or center point of the virtual article, and any vertex or center point of the first display area, etc. For example, with the center point as an example, after moving the virtual article to the target area, the center point of the first display area and the center point of the virtual article can be respectively extracted, and the direction from the center point of the first display area to the center point of the virtual article is the above-mentioned first direction, which can be determined as the moving direction.

As another example, it is also possible to determine, as the moving direction, a second direction whose directional difference value from the first direction is smaller than a preset difference value, wherein the preset difference value can be expressed in the form of an angle, etc. The preset difference value can be determined according to actual requirements, which is not limited herein. For example, it is continued to make the illustration with the above center point as an example. After extracting the center point of the first display area and the center point of the virtual article respectively, the two center points are connected, to obtain the connection line between the two center points. Based on the connection line, the angle between the connection line and the horizontal direction and the angle between the connection line and the vertical direction can be determined. For example, the virtual article is located in the direction of the upper right corner of the first display area, and the angle between the horizontal direction and the connection line between the center point of the virtual article and the center point of the first display area is 20 degrees. Assuming that the above-mentioned preset difference value is 10 degrees, then the above-mentioned second direction can be any direction whose included angle with the horizontal direction is between 10 degrees and 30 degrees, and the second direction is determined as the moving direction, which is equivalent to expanding the movable range of the first display area. The determination method for the moving direction is more flexible, which can improve the game experience of the user.

Figure 3:
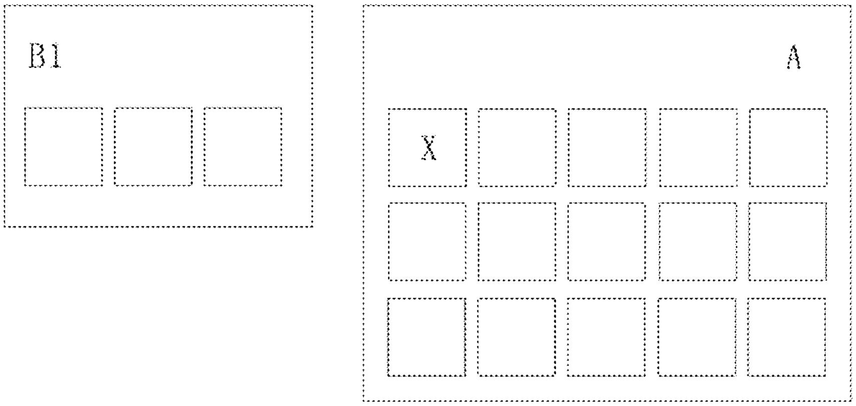
FIG. 3 is an interactive schematic diagram of another controlling display in a game provided by an embodiment of the present disclosure.

Referring to the interactive schematic diagram of another controlling display in a game shown in FIG. 3, each of the first storage container and the second storage container contains a plurality of article grids, and each article grid corresponds to the position at which the virtual article is placed in the storage container. The graphical user interface includes the first storage container displayed in the first display area B1, the container display area A of the second storage container. The virtual article X is pre-placed at Position 1 of the second storage container.

Figure 4:
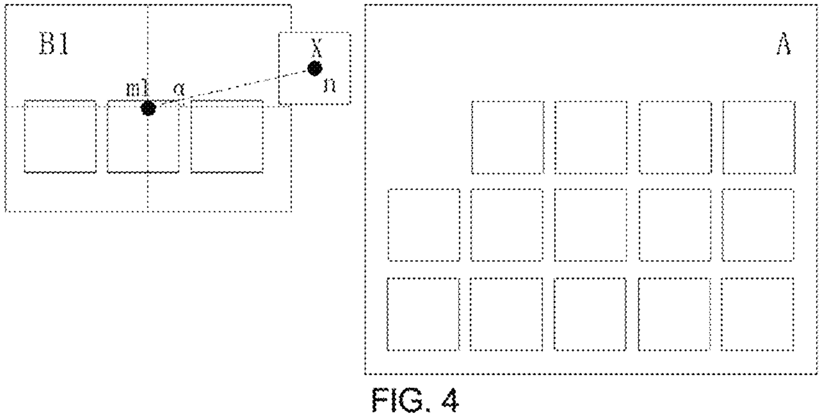
FIG. 4 is an interactive schematic diagram of another controlling display in a game provided by an embodiment of the present disclosure.
Figure 5:
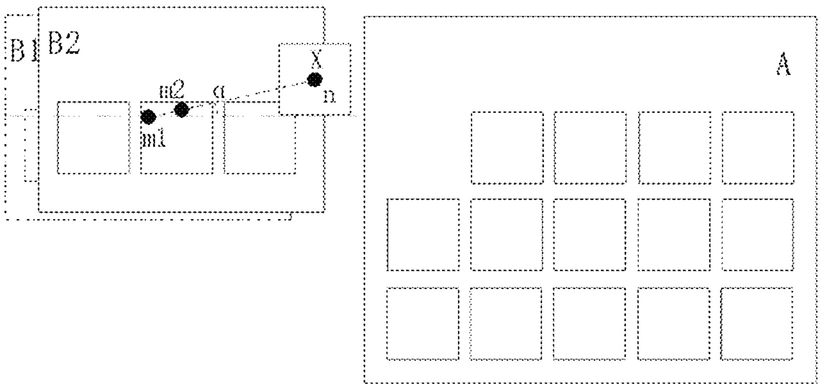
FIG. 5 is an interactive schematic diagram of another controlling display in a game provided by an embodiment of the present disclosure.

When the user needs to drag the virtual article X from the container display area A of the second storage container to the first display area B1 of the first storage container, particularly, referring to the interactive schematic diagram of another controlling display in a game shown in FIG. 4, the user drags the virtual article X from Position 1 and moves it to the right edge of the first display area B1 of the first storage container, wherein assuming that the center point of the first display area B1 of the first storage container is m1, the center point of the virtual article X is n, the center point m1 and the center point n are connected to obtain a connection line, and the angle between the obtained connection line and the horizontal direction is a, when any vertex of the virtual article X enters the first display area B1 and the first storage container is in an available state, the direction from the center point m1 to the center point n can be determined as the moving direction. Particularly, referring to the interactive schematic diagram of controlling display in a game shown in FIG. 5, the first display area B1 of the first storage container can be shifted as a whole along the direction of the connection line. In order to make the determined second display area in a more suitable display position, the shift amount is usually set in advance. If the shift amount set in advance is 10px, the first display area B1 of the first storage container moves by 10px along the direction whose included angle from the horizontal direction is a, so as to obtain the second display area B2 of the first storage container, wherein the center point of the second display area B2 is m2, the center point m2 of the second display area B2 is located on the connection line between the center point m1 of the first display area B1 and the center point n of the virtual article X, and the distance between the center point m2 of the second display area B2 and the center point m1 of the first display area B1 is the above shift amount, that is, 10px.

When the user stops the drag or touch operation on the virtual article X, if any vertex of the virtual article X is in the first display area B1, it can be considered that the virtual article X is in the first display area B1, then the virtual article X can be placed in the first display area B1, the second display area B2 is moved back to its original position, that is, moved back to the position of the first display area B1, and the corresponding center point m2 is moved back to the position of the center point m1. If the virtual article X is not in the first display area B1, the second display area B2 still moves back to the original position, that is, moves back to the position of the first display area B1.

In the above-mentioned method of controlling display in the game, the moving direction may be determined according to the first direction in which the virtual article is located relative to the first display area, or the second direction whose difference value from the first direction is smaller than the preset difference value may be determined as the moving direction. The method of determining the moving direction is more flexible and diverse. The position of the first display area is changed by the determined moving direction so as to perform the feedback prompt, which is not limited by the color of the interface, and is more intuitive, which can reduce the cost of the user for understanding the game, and improve the game experience of the user.

The above-mentioned moving direction can also be determined by the following method. The position at which the virtual article is located is obtained in response to the virtual article moving to the target area; and the moving direction corresponding to the position at which the virtual article is located is determined based on the preset correspondence relationship between the position and the moving direction.

In some examples, the correspondence relationship between the position at which the virtual article is located and the moving direction can be preset. For example, after moving the virtual article to the target area, if the position of the virtual article is on the right side of the first display area, the corresponding moving direction may be the direction obtained by the first display area being shifted to the right side; and if the position of the virtual article is on the left side of the first display area, the corresponding moving direction may be the direction obtained by the first display area being shifted to the left side. If the position of the virtual article is on the upper side of the first display area, the corresponding moving direction may be the direction obtained by the first display area being shifted upward; and if the position of the virtual article is on the lower side of the first display area, the corresponding moving direction may be the direction obtained by the first display area being shifted to the lower side. Particularly, the correspondence relationship between the position and the moving direction can be set according to actual needs, which is not limited here. When the virtual article is moved to the target area, the corresponding moving direction can be determined according to the preset correspondence relationship between the position at which the virtual article is located and the moving direction, so that the first display area can be shifted (offset) along the moving direction.

Figure 6:
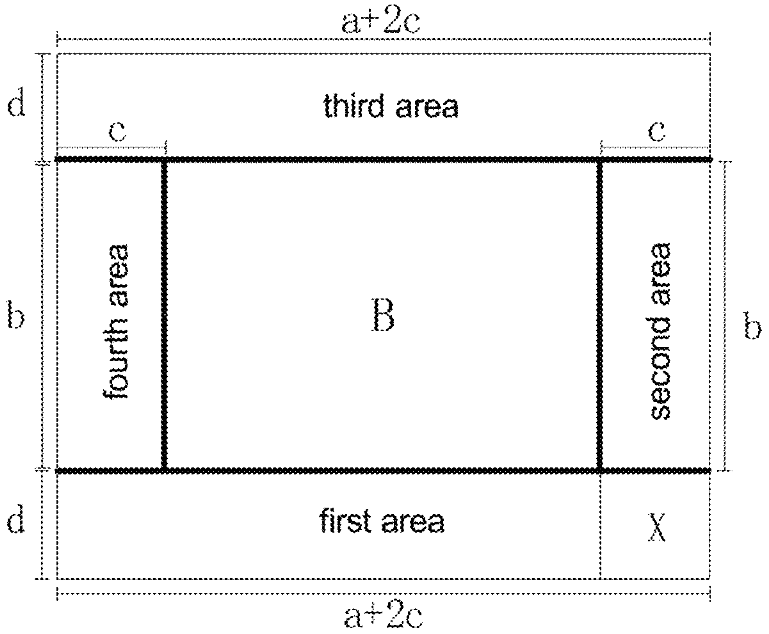
FIG. 6 is an interactive schematic diagram of another controlling display in a game provided by an embodiment of the present disclosure.

Referring to the interactive schematic diagram of controlling display in a game shown in FIG. 6, the width of the area range of the first display area B of the first storage container is "a", and the height thereof is "b", and the width of the virtual article X is "c", and the height thereof is "d". In this method, the correspondence relationship between the position at which the virtual article is located after moving to the target area and the moving direction is preset. Assuming that the moving distance is 10px, if the user needs to drag the virtual article X to the first storage container, when any vertex of the virtual article X enters the first display area B and the first display area B is available, if the virtual article X is in any position in the first area, it can be considered that the virtual article X enters the first display area B from below, and the first storage container is vertically shifted by 10px downward from the first display area B. When the virtual article X is at any position in the second area, it can be considered that the virtual article X enters the first storage container from the right, and the first storage container is horizontally shifted by 10px from the first display area B to the right. When the virtual article X is at any position in the third area, it can be considered that the virtual article X enters the first storage container from the above, and the first storage container is vertically shifted by 10px from the first display area B. When the virtual article X is in any position in the fourth area, it can be considered that the virtual article X enters the first storage container from the left, and the first storage container is horizontally shifted from the first display area B to the left, by 10px.

When the user stops the drag or touch operation acting on the virtual article X, if the virtual article X is in the second display area of the first storage container, the virtual article X can be placed into the first storage container, and the first storage container moves back to the first display area B from the second display area. When the user stops the drag or touch operation on the virtual article X, if the virtual article X is not in the second display area of the first storage container, the first storage container moves back to the first display area B from the second display area.

In the above method of controlling display in the game, the correspondence relationship between the moving direction and the position at which the virtual article is located after the virtual article is moved to the target area can be preset. After the position at which the virtual article is located is obtained, the corresponding moving direction can be determined. The method of determining the moving direction is simpler, faster and convenient, which can further improve the game experience of the user.

Another specific method of determining the second display area of the first storage container is described below. In response to the virtual article moving to the target area, the deformation processing is performed on the area range of the first display area to obtain the second display area.

The above deformation processing may specifically include adjusting the size of the area range of the first display area, etc. In actual implementation, after the virtual article moves to the target area, the area range of the first display area may be wholly or locally enlarged or zoomed out. By changing the area range of the first display area, the second display area is obtained for performing the feedback prompting. This feedback prompting method is not limited by color of the interface, and is more intuitive, which can reduce the cost of the user for understanding the game and improve the game experience of the user.

Furthermore, when the user drags the virtual article to reach the target area, the area range of the first display area can be expanded, so that the feedback prompting method is more intuitive, further reduces the cost of the user for understanding the game, and improves the game experience of the user. Specifically, in response to the virtual article moving to the target area, the area range of the first display area is expanded to obtain the second display area. The expansion of the area range of the first display area here may means that the area range of the first display area is expanded as a whole, or the area range of the first display area is expanded locally. The specific expansion factor can be set based on actual needs. For example, if the expansion factor is set to be 120%, the area range of the obtained second display area is 120% of the area range of the first display area. For another example, after the virtual article moves to the target area, the area range of the first display area can be expanded as a whole, to obtain the second display area.

Figure 7:
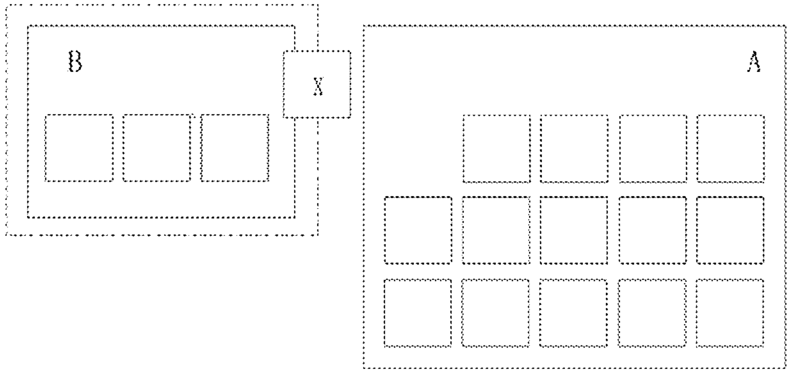
FIG. 7 is an interactive schematic diagram of another controlling display in a game provided by an embodiment of the present disclosure.

Referring to the interactive schematic diagram of controlling display in a game shown in FIG. 7, when the user needs to drag the virtual article X from the container display area A of the second storage container to the first storage container, if any vertex of the virtual article X enters the first display area B of the first storage container, when the first display area B is available, the first display area B can be enlarged as a whole, and the second display area obtained after the enlargement is the area surrounded by the dotted frame. The second display area, which is obtained by expanding it as a whole, can be closer to the virtual article, enabling the feedback prompting method to be more obvious.

Furthermore, when the user drags the virtual article to reach the target area, the area range of the first display area can be locally expanded. This feedback prompting method of local expansion can improve the intuitiveness of the feedback prompt, and simultaneously reduce the occlusion of the non-enlarged area in the graphical user interface or the first display area as much as possible. It can improve the game experience of the user while reducing the cost of the user for understanding the game. Specifically, in response to the virtual article moving to the target area, the sub-area to be enlarged in the first display area is determined based on the relative position between the virtual article and the first display area. The sub-area is enlarged, and the processed first display area is determined as the second display area.

The above sub-area to be enlarged can be determined according to the relative position between the virtual article and the first display area. For example, after the virtual article moves to the target area, if the position of the virtual article is on the right side of the first display area, a part of the right area within the right edge of the first display area may be determined as the sub-area to be enlarged in the first display area. The specific distance to be expanded, within the edge line, can be preset according to actual needs. For example, the preset specific distance to be expanded is 10px, the part of the right area in the first display area, which is away from the right edge by 10px, can be determined as the sub-area to be enlarged. The enlargement factor of the sub-area can also be preset as required. For example, if the preset enlargement factor is 200%, the sub-area is enlarged by 200%. The center point, any vertex or specified edge of the sub-area can be used as the benchmark for the enlargement. Usually, in order to make the enlarged sub-area, while being closer to the virtual article, also more conforming to the understanding habits of the user, the direction of enlarging the sub-area is usually consistent with the direction of the position of the virtual article relative to the first display area. That is, if the virtual article is on the right side of the first display area, the determined sub-area can be enlarged to the right side, with the left edge of the sub-area as the benchmark.

Figure 8:
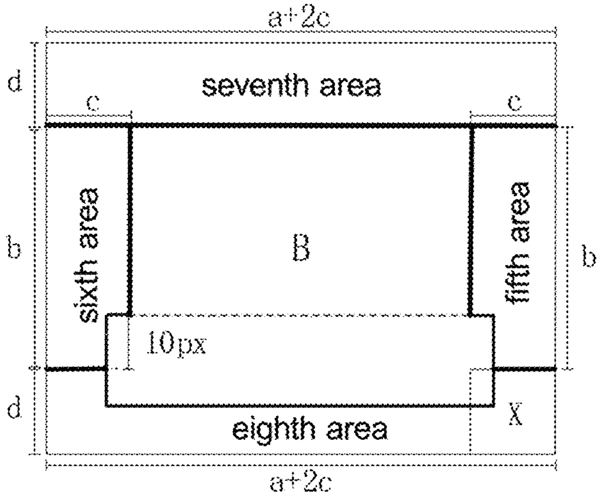
FIG. 8 is an interactive schematic diagram of another controlling display in a game provided by an embodiment of the present disclosure.

Referring to the interactive schematic diagram of controlling display in a game shown in FIG. 8, the area range of the first display area B of the first storage container has a width of "a" and a height of "b", and the virtual article X has a width of "c" and a height of "d". In this method, the correspondence relationship between the position, where the virtual article is located after moving to the target area, and the moving direction, is preset. It is assumed that the preset specific distance to be expanded is 10px, and the enlargement ratio is 200%. If the user needs to drag the virtual article X to the first storage container, when any vertex of the virtual article X enters the first display area B of the first storage container and the first storage container is in the state of being available, when the virtual article X is located at any position in the fifth area, it can be considered that the virtual article X enters the first display area B from the right, and the sub-area within the first display area B, which is away from the right edge by 10px, is enlarged to the right side by 200%, with the left edge of the sub-area as the benchmark. When the virtual article X is at any position in the sixth area, it can be considered that the virtual article X enters the first display area B from the left, and the sub-area within the first display area B, which is away from the left edge by 10px, is enlarged to the left side by 200%, with the right edge of the sub-area as the benchmark. When the virtual article X is at any position in the seventh area, it can be considered that the virtual article X enters the first display area B from the above, and the sub-area within the first display area B, which is away from the upper edge by 10px, is enlarged to the above by 200%, with the lower edge of the sub-area as the benchmark. When the virtual article X is at any position in the eighth area, it can be considered that the virtual article X enters the first display area B from the below, and the sub-area within the first display area B, which is away from the lower edge by 10px, is enlarged to the below by 200%, with the upper edge of the sub-area as the benchmark. FIG. 8 is an enlarged effect diagram when the virtual article X at any position in the eighth area enters the first display area B.

In the above method of controlling display in the game, the user can drag the virtual article to the first display area, and the first display area is changed in terms of position and/or area range. This feedback prompting method is more intuitive and obvious, which can improve the intimacy between the user operation and the feedback prompt, and enhance the usability hint. And, in this method, the first display area does not adopt the feedback prompting method of color display parameters, and it is not needed to newly add the visual resources, such as the edge lighting, edge drawing with special color, etc. Therefore, this feedback prompting method will not be limited by the color of the interface, and it can also more effectively distinguish the feedback prompts of virtual articles under different operations. For example, for the warehouse system, it can more effectively distinguish the style feedback of the virtual article control member of the warehouse system under different operations.

Another specific method of determining the second display area of the first storage container is described below. In response to the virtual article moving to the target area, it is determined that the first storage container is available, wherein in the state of being available, the first storage container has a space for placing the virtual articles; and a second display area of the first storage container is determined. For example, if in the first storage container, the positions where the virtual articles are placed are in the form of article grids, after the virtual article is moved to the target area. If there are still free article grids in the first storage container and the number of the free article grids is sufficient to allow placement of the virtual articles, the first storage container will not be overweight after the virtual articles are placed into the free article grids. It can be considered that the first storage container has space for placing the virtual articles, and it can be determined that the first storage container is available. After it is determined that the first storage container is available, the second display area of the first storage container is determined. By means of first determining that the first storage container is available and then determining the second display area of the first storage container, the effectiveness of operation of controlling display can be ensured, thereby improving the game experience of the user.

A specific implementation method for controlling the first storage container to move from the first display area to the second display area is described below. In actual implementation, in order to further improve the intuitiveness of the feedback prompting method and enhance the game experience of the user, after the second display area of the first storage container is determined, the first storage container can be controlled according to the preset movement speed to move from the first display area to the second display area. For example, the first storage container can be controlled to quickly move from the first display area to the second display area, or the first storage container can be controlled to move slowly from the first display area to the second display area. Specifically, the preset movement speed can be set according to actual needs.

As another example, after the second display area of the first storage container is determined, the first storage container may also be controlled according to a preset movement speed to move cyclically between the first display area and the second display area. For example, the first storage container can be controlled according to the preset movement speed to move from the first display area to the second display area. After the first storage container moves to the second display area, the first storage container can be made to be first displayed for a preset duration in the second display area, then the first storage container is controlled according to the preset movement speed to move from the second display area to the first display area, and then the first storage container is made to be displayed for a preset duration in the first display area, and it is cyclically moved in this way. Such feedback prompting method of this dynamic movement is more intuitive and easier to attract the user's attention, which can further reduce the cost of the user for understanding the game and improve the game experience of the user.

Figure 9:
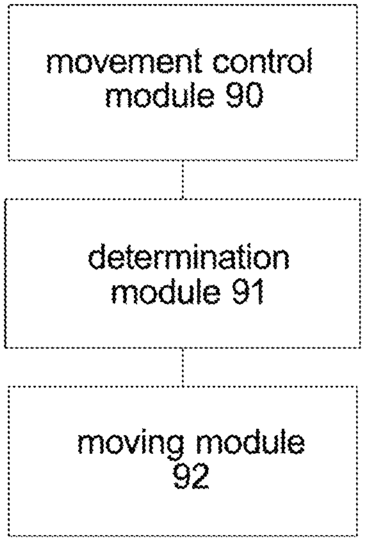
FIG. 9 is a schematic structural diagram of a device of controlling display in a game provided by an embodiment of the present disclosure.

Corresponding to the above method embodiment, referring to a device of controlling display in a game shown in FIG. 9, a graphical user interface is provided through a terminal device, and the graphical user interface includes virtual articles and a first storage container displayed in the first display area. The device includes: a movement control module 90 for controlling the virtual article to move in response to a movement control operation for the virtual article; a determination module 91 for determining the second display area of the first storage container in response to the virtual article moving to the target area, wherein the target area includes: a first display area of the first storage container, or an area which is away from the first display area at the distance within a preset range, the second display area is different from the first display area in terms of position and/or area range, at least partial area of the second display area is closer to the virtual article than the first display area; and a moving module 92 for controlling the first storage container to move from the first display area to the second display area.

In the above device of controlling display in the game, in response to the virtual article moving to the target area, the second display area of the first storage container is determined, wherein the target area includes: the first display area of the first storage container, or an area which is away from the first display area at the distance within a preset range, the second display area is different from the first display area in terms of the position and/or the area range, and at least partial area of the second display area is closer to the virtual article than the first display area; and controlling the first storage container to move from the first display area to the second display area. In this device, after the virtual article moves to the target area, the second display area is determined by changing the position and/or area range of the first display area, so as to provide the feedback prompt. This feedback prompting method is not limited by color of the interface and is intuitive, which can reduce the cost of the user for understanding the game.

The above-mentioned graphical user interface further includes a container display area of the second storage container. The virtual article is pre-placed in the second storage container. The above-mentioned movement control module is further configured for controlling, in response to the movement control operation for the virtual article, the virtual article to be removed from the second storage container.

The above determination module is further configured for determining, in response to the virtual article moving to the target area, the moving direction based on the relative position between the virtual article and the first display area; and controlling the first display area to shift along the moving direction to obtain the second display area.

The above determination module is further configured for determining, in response to the virtual article moving to the target area, the first direction in which the virtual article is located relative to the first display area, as the moving direction; or determining, in response to the virtual article moving to the target area, the second direction whose direction difference value from the first direction is less than the preset difference value, as the moving direction, wherein the first direction includes: the direction in which the virtual article is located relative to the first display area.

The above determination module is further configured to: acquire the position at which the virtual article is located, in response to the virtual article moving to the target area; and determine the moving direction corresponding to the position at which the virtual article is located, based on the preset correspondence relationship between the position and the moving direction.

The above determination module is further configured for performing, in response to the virtual article moving to the target area, the deformation processing on the area range of the first display area to obtain the second display area.

The above determination module is further configured for expanding, in response to the virtual article moving to the target area, the area range of the first display area to obtain the second display area.

The above determination module is further configured for determining, in response to the virtual article moving to the target area, the to-be-enlarged sub-area in the first display area based on the relative position between the virtual article and the first display area; and performing enlargement processing on the sub-area, and determining the processed first display area as the second display area.

The above determination module is further configured for determining, in response to the virtual article moving to the target area, that the first storage container is available, wherein in the state of being available, the first storage container has a space for placing the virtual article; and determining the second display area of the first storage container.

The above-mentioned moving module is also configured to: control, according to the preset movement speed, the first storage container to move from the first display area to the second display area; or, control, according to the preset movement speed, the first storage container to circularly move between the first display area and the second display area.

The above device of controlling display in the game has the implementation principle and produced technical effects, which are same as those of the aforementioned embodiments of the method of controlling display in the game. For a brief description, the corresponding contents in the aforementioned embodiments of the method of controlling display in the game may be referred to, for obtaining the matters not mentioned in the embodiments of the device of controlling display in the game.

This embodiment also provides electronic equipment, including a processor and a memory, wherein the memory stores machine-executable instructions that can be executed by the processor, and the processor executes the machine-executable instructions to implement the above method of controlling display in a game. The electronic equipment may be a server or a terminal device.

Figure 10:
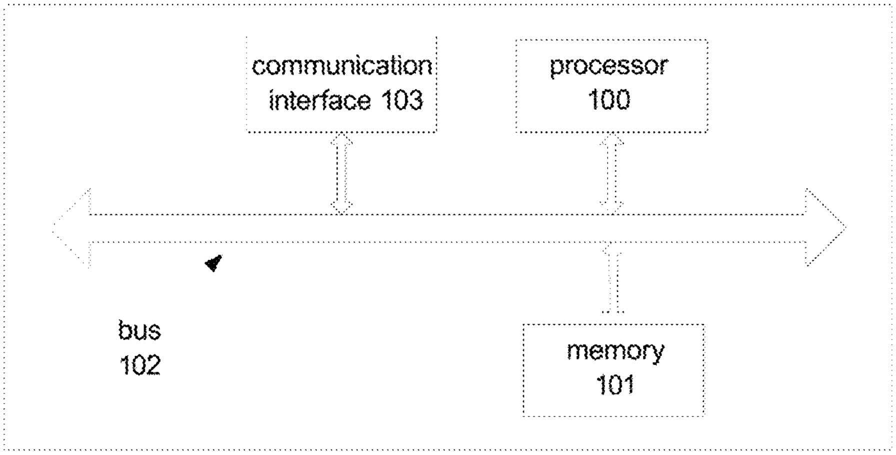
FIG. 10 is a schematic structural diagram of electronic equipment according to an embodiment of the present disclosure.

Referring to FIG. 10, the electronic equipment includes a processor 100 and a memory 101, wherein the memory 101 stores machine-executable instructions that can be executed by the processor 100, and the processor 100 executes the machine-executable instructions to realize the above method of controlling display in the game.

Responding to the movement control operation for virtual articles, the virtual article is controlled to move; and in response to the virtual article moving to the target area, the second display area of the first storage container is determined, wherein the target area includes the first display area of the first storage container or the area which is away from the first display area at the distance within the preset range. The second display area and the first display area are different in terms of position and/or area range. At least partial area of the second display area is closer to virtual article than the first display area. The first storage container is controlled to move from the first display area to the second display area.

In some examples, the above graphical user interface also includes a container display area of the second storage container. The virtual article is pre-placed in the second storage container. The step of controlling the virtual article to move in response to the movement control operation for the virtual article includes: controlling the virtual article to be removed from the second storage container, in response to the movement control operation for the virtual article.

In some examples, the above step of determining the second display area of the first storage container in response to the virtual article moving to the target area includes: determining the moving direction, in response to the virtual article moving to the target area, based on the relative position between the virtual article and the first display area; and controlling the first display area to shift along the moving direction to obtain a second display area.

In some examples, the above step of determining the moving direction in response to the virtual article moving to the target area based on the relative position between the virtual article and the first display area includes: determining the direction in which the virtual article is located relative to the first display area, as the moving direction, in response to the virtual article moving to the target area; or, determining, in response to the virtual article moving to the target area, the second direction whose direction difference value is smaller than the preset difference value, as the moving direction, wherein the first direction includes the direction in which the virtual article is located relative to the first display area.

In some examples, the step of determining the moving direction in response to the virtual article moving to the target area based on the relative position between the virtual article and the first display area includes: acquiring the position in which the virtual article is located, in response to the virtual article moving to the target area; and determining the moving direction corresponding to the position in which the virtual article is located, based on the preset correspondence relationship between the position and the moving direction.

In some examples, the above step of determining the second display area of the first storage container in response to the virtual article moving to the target area includes: performing the deformation processing on the area range of the first display area in response to the virtual article moving to the target area, so as to obtain the second display area.

In some examples, the above step of performing the deformation processing on the area range of the first display area in response to the virtual article moving to the target area so as to obtain the second display area includes: expanding the area range of the first display area in response to the virtual article moving to the target area, so as to obtain the second display area.

In some examples, the above step of expanding the area range of the first display area in response to the virtual article moving to the target area so as to obtain the second display area includes: determining the to-be-enlarged sub-area in the first display area, in response to the virtual article moving to the target area, based on the relative position between the virtual article and the first display area; and performing the enlargement processing on the sub-area, and determining the processed first display area as the second display area.

In some examples, the above step of determining the second display area of the first storage container in response to the virtual article moving to the target area includes: determining, in response to the virtual article moving to the target area, that the first storage container is available, wherein in the state of being available, the first storage container has the space for placing the virtual article; and determining the second display area of the first storage container.

In some examples, the above step of controlling the first storage container to move from the first display area to the second display area includes: controlling, according to the preset movement speed, the first storage container to move from the first display area to the second display area; or, controlling, according to the preset movement speed, the first storage container to circularly move between the first display area and the second display area.

In the above way, after the virtual article is moved to the target area, by means of changing the position and/or area range of the display area of the first storage container, the feedback prompt for the movement of the virtual article is realized. This feedback prompting method is more intuitive, convenient for users to understand, and at the same time, is not limited by color and style of the interface, which can reduce the cost of the user for understanding the game.

Furthermore, the electronic equipment shown in FIG. 10 also includes a bus 102 and a communication interface 103.

The processor 100, the communication interface 103 and the memory 101 are connected through the bus 102.

Here, the memory 101 may include a high-speed random access memory (RAM), and may also include a non-volatile memory, such as, at least one disk storage. The communication between the network element of the system and at least one other network element is implemented through at least one communication interface 103 (which may be wired or wireless), and the Internet, a wide area network, a local network, a metropolitan area network, and the like may be used. The bus 102 may be an ISA bus, a PCI bus, an EISA bus, or the like. The buses can be divided into an address bus, a data bus, a control bus, and the like. For ease of representation, only one bidirectional arrow is shown in FIG. 10, but it does not mean that there is only one bus or one type of buses.

The processor 100 may be an integrated circuit chip with signal processing capability. In the implementation process, individual steps of the above-mentioned method may be completed by an integrated logic circuit of hardware in the processor 100 or instructions in the form of software. The above-mentioned processor 100 may be a general-purpose processor, including a central processing unit (referred to as CPU for short), a network processor (referred to as NP for short), etc.; may also be a digital signal processor (referred to as DSP for short), Application Specific Integrated Circuit (referred to as ASIC for short), Field-Programmable Gate Array (referred to as FPGA for short) or other programmable logic devices, discrete gate or transistor logic devices, and discrete hardware components. Various methods, steps, and logical block diagrams disclosed in the embodiments of the present disclosure can be implemented or executed. A general purpose processor may be a microprocessor, or the processor may be any conventional processor or the like. The steps of the method disclosed in conjunction with the embodiments of the present disclosure may be directly embodied as being executed by a hardware decoding processor, or executed by a combination of hardware and software modules in the decoding processor. The software modules may be located in the random access memory, flash memory, read-only memory, programmable read-only memory or electrically erasable programmable memory, registers and other storage media mature in the art. The storage medium is located in the memory 101, and the processor 100 reads the information in the memory 101, and completes the steps of the methods of the foregoing embodiments in combination with its hardware.

This embodiment also provides a machine-readable storage medium, and the machine-readable storage medium stores machine-executable instructions. When the machine-executable instructions are called and executed by the processor, the machine-executable instructions cause the processor to implement the above-mentioned method of controlling display in the game.

In response to the movement control operation for virtual article, and the virtual article is controlled to move. The second display area of the first storage container is determined in response to the virtual article moving to the target area, wherein the target area includes: a first display area of the first storage container, or an area which is away from the first display area at the distance within a preset range. The second display area and the first display area are different in terms of position and/or area range. At least partial area of the second display area is closer to the virtual article than the first display area. The first storage container is controlled to move from the first display area to the second display area.

In some examples, the graphical user interface also includes a container display area of the second storage container. The virtual article is pre-placed in the second storage container. The step of controlling the virtual article to move in response to the movement control operation for the virtual article includes: controlling the virtual article to be removed from the second storage container, in response to the movement control operation for the virtual article.

In some examples, the above step of determining the second display area of the first storage container in response to the virtual article moving to the target area includes: determining the moving direction in response to the virtual article moving to the target area, based on the relative position between the virtual article and the first display area; and controlling the first display area to shift along the moving direction to obtain the second display area.

In some examples, the above step of determining the moving direction in response to the virtual article moving to the target area based on the relative position between the virtual article and the first display area includes: determining, in response to the virtual article moving to the target area, the first direction in which the virtual article is located relative to the first display area, as the moving direction; or, determining, in response to the virtual article moving to the target area, the second direction whose direction difference value from the first direction is less than the preset difference value, as the moving direction, wherein the first direction includes the direction in which the virtual article is located relative to the first display area.

In some examples, the above step of determining the moving direction in response to the virtual article moving to the target area based on the relative position between the virtual article and the first display area includes: acquiring the position at which the virtual article is located, in response to the virtual article moving to the target area; and determining the moving direction corresponding to the position at which the virtual article is located, based on the preset correspondence relationship between the position and the moving direction.

In some examples, the above step of determining the second display area of the first storage container in response to the virtual article moving to the target area includes: performing the deformation processing on the area range of the first display area in response to the virtual article moving to the target area, so as to obtain the second display area.

In some examples, the above step of performing the deformation processing on the area range of the first display area in response to the virtual article moving to the target area so as to obtain the second display area includes: expanding the area range of the first display area in response to the virtual article moving to the target area, to obtain a second display area.

In some examples, the above step of expanding the area range of the first display area in response to the virtual article moving to the target area to obtain a second display area includes: determining the to-be-enlarged sub-area in the first display area in response to the virtual article moving to the target area, based on the relative position between the virtual article and the first display area; and performing the enlargement processing on the sub-area, and determining the processed first display area as the second display area.

In some examples, the above step of determining the second display area of the first storage container in response to the virtual article moving to the target area includes: determining that the first storage container is available, in response to the virtual article moving to the target area, wherein in the state of being available, the first storage container has a space for placing virtual articles; and determining a second display area of the first storage container.

In some examples, the above step of controlling the first storage container to move from the first display area to the second display area includes: controlling the first storage container to move from the first display area to the second display area, according to the preset movement speed; or, controlling, according to the preset movement speed, the first storage container to move circularly between the first display area and the second display area.

In the above in-game display controlling method, device and electronic equipment, it determines, in response to the virtual article moving to a target area, a second display area of the first storage container, wherein the target area includes: a first display area of the first storage container, or an area which is away from the first display area at a distance within a preset range, the second display area is different from the first display area in terms of position and/or area range, and at least partial area of the second display area, with respect to the first display area, is closer to the virtual article; and controls the first storage container to move from the first display area to the second display area. In this method, after the virtual article moves to the target area, by means of changing the position and/or area range of the display area of the first storage container, a feedback prompt for the movement of the virtual article is realized, and such feedback prompting method is more intuitive and easy for users to understand, and at the same time, it is not limited by the color and style of the interface, therefore reducing the cost of the user for understanding the game.

In the above way, after the virtual article is moved to the target area, by means of changing the position and/or area range of the display area of the first storage container, the feedback prompt for the movement of the virtual article is realized. This feedback prompting method is more intuitive, convenient for users to understand, and is not limited by the color and style of the interface, thus reducing the cost of user for understanding the game.

The method, device, electronic equipment and computer program product of storage medium of controlling display in a game provided by the embodiment of the present disclosure includes a computer-readable storage medium storing program codes, and the instructions included in the program codes can be used to execute the method of the foregoing method embodiment, and the method embodiment can be referred to, for obtaining the specific implementation thereof, which will not be repeated here.

Those skilled in the art can clearly understand that, for the convenience and brevity of description, the corresponding process in the foregoing method embodiments may be referred to, for obtaining the specific working process of the system and device described above, which will not be repeated here.

In addition, in the description of the embodiments of the present disclosure, unless expressly specified and limited otherwise, the terms, "installation", "link" and "connection" should be understood in a broad sense. For example, it may be a fixed connection or a detachable connection, or the integral connection; it can be a mechanical connection or an electrical connection; it can be a direct connection, or an indirect connection through an intermediate medium, or the internal communication between the two components. For those skilled in the art, the specific meanings of the above terms in the present disclosure can be understood in specific situations.

If the functions are implemented in the form of software functional units and sold or used as independent products, they may be stored in a computer-readable storage medium. Based on this understanding, the technical solution of the present disclosure in essence, or the part contributing to the prior art or the part of the technical solution can be embodied in the form of a software product. The computer software product is stored in a storage medium, and include several instructions which are used to cause a computer device (which may be a personal computer, a server, or a network device, etc.) to execute all or part of the steps of the methods described in the various embodiments of the present disclosure. The aforementioned storage medium includes: U disk, mobile hard disk, read-only memory (ROM), random access memory (RAM), magnetic disk or optical disk and other media that can store program codes.

In the description of the present disclosure, it should be noted that the orientation or position relationship, indicated by the terms "center", "upper", "lower", "left", "right", "vertical", "horizontal", "inner", "outer", etc., is based on the orientation or position relationship shown in the drawings, which is only for the convenience of describing the present disclosure and simplifying the description, rather than indicating or implying that the indicated device or element must be of a specific orientation or be constructed and operated in a specific orientation, and therefore should not be construed as limiting the present disclosure. Furthermore, the terms, "first", "second", and "third", are used for descriptive purposes only and should not be construed to indicate or imply importance in relativity.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Finally, it should be noted that the above embodiments are only specific implementations of the present disclosure, and are used to illustrate the technical solutions of the present disclosure, but not to limit them. The protection scope of the present disclosure is not limited thereto. Although the present disclosure has been described in detail with reference to the foregoing embodiments, those skilled in the art should understand that: any person skilled in the art, within the technical scope disclosed by the present disclosure, can still modify the technical solutions described in the foregoing embodiments or can easily think of change, or equivalently replace some of the technical features. However, these modifications, changes or replacements do not make the essence of the corresponding technical solutions deviate from the spirit and scope of the technical solutions of the embodiments of the present disclosure, and should be included in the protection scope of the present disclosure. Therefore, the protection scope of the present disclosure should be subject to the protection scope of the claims.

What is claimed is:

1. An in-game display controlling method, comprising:

controlling, by a terminal, a virtual article to move in response to a movement control operation for the virtual article, wherein the terminal comprises a graphical user interface, the graphical user interface comprises a first display area, and at least one virtual article and a first storage container are displayed in the first display area;

determining, in response to the virtual article moving to a target area, a second display area for the first storage container, wherein:

(i) the target area comprises (A) the first display area of the first storage container or (B) an area within a preset distance of the first display area;

(ii) the second display area differs from the first display area in position or size; and (iii) at least a portion of the second display area, relative to the first display area, is closer to the virtual article; and controlling, by the terminal, the first storage container to move from the first display area to the second display area.

2. The method according to claim 1, wherein the graphical user interface further comprises a container display area of a second storage container; the virtual article is pre-placed in the second storage container; and wherein controlling the virtual article to move in response to the movement control operation for the virtual article comprises: controlling the virtual article to be removed from the second storage container, in response to the movement control operation for the virtual article.

3. The method according to claim 1, wherein determining, in response to the virtual article moving to the target area, the second display area for the first storage container comprises:

determining a moving direction, in response to the virtual article moving to the target area, based on a relative position between the virtual article and the first display area; and controlling the first display area to shift along the moving direction to obtain the second display area.

4. The method according to claim 3, wherein determining the moving direction in response to the virtual article moving to the target area based on the relative position between the virtual article and the first display area comprises:

determining, in response to the virtual article moving to the target area, a first direction in which the virtual article is located relative to the first display area, as the moving direction; or determining, in response to the virtual article moving to the target area, a second direction whose direction difference value from the first direction is less than a preset difference value, as the moving direction, wherein the first direction comprises: a direction in which the virtual article is located relative to the first display area.

5. The method according to claim 3, wherein determining the moving direction in response to the virtual article moving to the target area based on the relative position between the virtual article and the first display area comprises:

obtaining a position where the virtual article is located, in response to the virtual article moving to the target area; and determining the moving direction corresponding to the position where the virtual article is located, based on a preset correspondence relationship between the position and the moving direction.

6. The method according to claim 1, wherein determining, in response to the virtual article moving to the target area, the second display area for the first storage container comprises:

performing, in response to the virtual article moving to the target area, a deformation processing on an area range of the first display area, to obtain the second display area.

7. The method according to claim 6, wherein performing, in response to the virtual article moving to the target area, the deformation processing on the area range of the first display area to obtain the second display area comprises:

expanding, in response to the virtual article moving to the target area, the area range of the first display area, to obtain the second display area.

8. The method according to claim 7, wherein expanding, in response to the virtual article moving to the target area, the area range of the first display area to obtain the second display area comprises:

determining a to-be-enlarged sub-area in the first display area, in response to the virtual article moving to the target area, based on a relative position between the virtual article and the first display area; and performing an enlargement processing on the sub-area, and determining processed first display area as the second display area.

9. The method according to claim 1, wherein determining, in response to the virtual article moving to the target area, the second display area for the first storage container comprises:

determining that the first storage container is available, in response to the virtual article moving to the target area, wherein in a state of being available, the first storage container comprises a space for placing the virtual article; and determining the second display area for the first storage container.

10. The method according to claim 1 wherein controlling the first storage container to move from the first display area to the second display area comprises:

controlling, according to a preset movement speed, the first storage container to move from the first display area to the second display area; or, controlling, according to the preset movement speed, the first storage container to move back and forth between the first display area and the second display area.

11. An electronic terminal, comprising a display screen, a processor and a memory, wherein the memory stores machine-executable instructions that can be executed by the processor, the display screen is configured to display a graphical user interface, and the processor is configured to:

control a virtual article to move in response to a movement control operation for the virtual article, wherein the graphical user interface comprises a first display area, and at least one virtual article and a first storage container are displayed in the first display area;

determine, in response to the virtual article moving to a target area, a second display area for the first storage container, wherein:

(i) the target area comprises (A) the first display area of the first storage container or (B) an area within a preset distance of the first display area;

(ii) the second display area differs from the first display area in position or size; and (iii) at least a portion of the second display area, relative to the first display area, is closer to the virtual article; and control the first storage container to move from the first display area to the second display area.

12. The electronic terminal according to claim 11, wherein the graphical user interface further comprises a container display area of a second storage container; the virtual article is pre-placed in the second storage container; and wherein the processor is further configured to:

control the virtual article to be removed from the second storage container, in response to the movement control operation for the virtual article.

13. The electronic terminal according to claim 11, wherein the processor is further configured to:

determine a moving direction, in response to the virtual article moving to the target area, based on a relative position between the virtual article and the first display area; and control the first display area to shift along the moving direction to obtain the second display area.

14. The electronic terminal according to claim 11, wherein the processor is further configured to:

perform, in response to the virtual article moving to the target area, a deformation processing on an area range of the first display area, to obtain the second display area.

15. The electronic terminal according to claim 11, wherein the processor is further configured to:

determine that the first storage container is available, in response to the virtual article moving to the target area, wherein in a state of being available, the first storage container comprises a space for placing the virtual article; and determine the second display area for the first storage container.

16. A non-transitory machine-readable storage medium, wherein the machine-readable storage medium stores machine-executable instructions which cause, when called and executed by a processor, the processor to implement an in-game display controlling method, the in-game display controlling method comprising:

controlling, by a terminal, a virtual article to move in response to a movement control operation for the virtual article, wherein the terminal comprises a graphical user interface, the graphical user interface comprises a first display area, and at least one virtual article and a first storage container are displayed in the first display area;

determining, in response to the virtual article moving to a target area, a second display area for the first storage container, wherein:

(i) the target area comprises (A) the first display area of the first storage container or (B) an area within a preset distance of the first display area;

(ii) the second display area differs from the first display area in position or size; and (iii) at least a portion of the second display area, relative to the first display area, is closer to the virtual article; and controlling, by the terminal, the first storage container to move from the first display area to the second display area.

17. The non-transitory machine-readable storage medium according to claim 16, wherein the graphical user interface further comprises a container display area of a second storage container; the virtual article is pre-placed in the second storage container; and wherein controlling the virtual article to move in response to the movement control operation for the virtual article comprises: controlling the virtual article to be removed from the second storage container, in response to the movement control operation for the virtual article.

18. The non-transitory machine-readable storage medium according to claim 16, wherein determining, in response to the virtual article moving to the target area, the second display area for the first storage container comprises:

determining a moving direction, in response to the virtual article moving to the target area, based on a relative position between the virtual article and the first display area; and controlling the first display area to shift along the moving direction to obtain the second display area.

19. The non-transitory machine-readable storage medium according to claim 16, wherein determining, in response to the virtual article moving to the target area, the second display area for the first storage container comprises:

determining that the first storage container is available, in response to the virtual article moving to the target area, wherein in a state of being available, the first storage container comprises a space for placing the virtual article; and determining the second display area for the first storage container.

20. The non-transitory machine-readable storage medium according to claim 16, wherein controlling the first storage container to move from the first display area to the second display area comprises:

controlling, according to a preset movement speed, the first storage container to move from the first display area to the second display area; or controlling, according to the preset movement speed, the first storage container to move back and forth between the first display area and the second display area.

* * * * *